United States Patent [19]

Takahashi et al.

[11] Patent Number: 5,436,519
[45] Date of Patent: Jul. 25, 1995

[54] FAN MOTOR

[75] Inventors: Shuji Takahashi; Eiji Yanai; Fumihiro Morikawa; Yosuke Kawate, all of Yonago, Japan

[73] Assignee: Nippon Densan Corporation, Japan

[21] Appl. No.: 178,518

[22] Filed: Jan. 7, 1994

Related U.S. Application Data

[62] Division of Ser. No. 67,843, May 27, 1993, Pat. No. 5,343,104.

[30] Foreign Application Priority Data

May 27, 1992 [JP] Japan .................. 4-162146
Jul. 30, 1992 [JP] Japan .................. 4-224831

[51] Int. Cl.⁶ .................. H02K 5/16; H02K 1/06; H02K 7/14; H02K 7/08
[52] U.S. Cl. .................. 310/217; 310/67 R; 310/90; 310/91
[58] Field of Search .................. 310/42, 43, 67 R, 90, 310/91, 217, 62, 63

[56] References Cited

U.S. PATENT DOCUMENTS

| | | | |
|---|---|---|---|
| 3,919,572 | 11/1975 | Desy | 310/67 R |
| 4,612,468 | 9/1986 | Stürm et al. | 310/67 R |
| 4,617,484 | 10/1986 | Buijsen | 310/67 R |
| 4,682,065 | 7/1987 | English et al. | 310/90 |
| 4,737,673 | 4/1988 | Wrobel | 310/90 |
| 4,934,041 | 6/1990 | Hoover et al. | 310/91 |
| 5,013,957 | 5/1991 | Wrobel | 310/67 R |
| 5,170,086 | 12/1992 | Wrobel et al. | 310/67 R |
| 5,245,236 | 9/1993 | Horng | 310/67 R |

FOREIGN PATENT DOCUMENTS

| | | | |
|---|---|---|---|
| 2-254951 | 10/1990 | Japan | 310/91 |
| 3-112334 | 5/1991 | Japan | 310/90 |

*Primary Examiner*—Steven L. Stephan
*Assistant Examiner*—Clayton E. LaBalle

[57] ABSTRACT

A fan motor has a pair of ball bearings placed in the vicinity of each end of an inner side of a bearing race. A plurality of projections are sequentially placed circumferentially around a center portion of the bearing race to axially locate both the ball bearings. A plurality of low-profile projections are sequentially formed between neighboring projections on the inner side surface of the bearing race and are axially elongated from one installing position to that of another installing position of respective ball bearings. The ball bearings are supported by the inner side of each low-profile projection respectively at one end portion and the other end portion of the low profile-projections.

10 Claims, 11 Drawing Sheets

FAN MOTOR

This is a division of application Ser. No. 08/067,843 filed on May 27,1993, now U.S. Pat. No. 5,343,104.

FIELD OF THE INVENTION

The present invention is directed to a fan motor for producing currents of cooling air, and, more particularly, to the fan motor applied for use with electric and electronic equipment.

DESCRIPTION OF THE PRIOR ART

A conventional fan motor typically comprises a housing with which a cylindrical bearing race is integrally formed in the center, a bearing held inside the cylindrical race, an impeller, a rotating shaft for the impeller inserted into the bearing, a ring of rotor magnets or a circular-shaped rotor magnet supported inside the rotor portion of the impeller, and a stator attached to the outer circumferential surface of the bearing race and facing from inside toward the attached rotor magnet.

Typically a pair of ball bearings are used to rotatably support the impeller through the rotating shaft. Recently, however, a sleeve bearing made of less expensive but wear-resisting metals is more in widespread use. The rotating shaft inserted into the bearing is provided, at its end, with a disk-like thrust plate. Further, a stopper for passage restricting the thrust plate is press fitted onto the rotating shaft.

The fan motor constructed as above suffers a problem. The stopper may be attached in press fit with the rotating shaft, with a slight inclination introduced rather than at exact right angles with respect the rotating shaft. The thrust plate urged by the stopper partially touches one end of the sleeve bearing, causing mechanical rubbing noise or the thrust plate to wear locally.

In the conventional fan motor, the stator is typically fitted around the outer circumferential surface of the bearing race or, in addition, a glue is applied to further secure the stator onto the bearing race.

In any kind of the fitting of the stator around the outer circumferential surface of the bearing race, however, control of dimensions of the bearing race is a difficult job, and the applying of glue is time-consuming.

The housing of the fan motor is typically resin-molded. In its molding operation, the bearing race is integrally molded. In a type of fan motor in which the bearing race houses a pair of ball bearings, its inner wall portion is projected inwardly between both bearings to separate one from the other inside the bearing race. It is standard practice to arrange the parting face of a pair of molds so that it comes to the inwardly projected portion in the course of molding the housing.

In such a molding process, however, each of the two inner circular wall portions of the race receiving the pair of bearings are molded by a different mold. If any degree of axial misalignment takes place between the two molds, the pair of ball bearings are axially misaligned, too. Such a misalignment causes an inclination of the rotating shaft of the impeller which is inserted through both bearings. In a compact fan motor in which the separation between a ball bearings is relatively small, a large shaft inclination will result.

SUMMARY OF THE INVENTION

It is a first object of the present invention to provide a fan motor in which a thrust plate slides on a sleeve bearing keeping its uniform circular contact with the end face of a sleeve bearing even if the thrust plate is attached onto the shaft with an inclination which may be introduced in the course of press fitting a stopper along with the thrust plate onto the shaft inserted through bearings.

It is a second object of the present invention to provide a fan motor in which control of radial dimensions of the bearing race is relatively easily made and a stator is firmly attached onto the outer circumferential surface of the bearing race without the use of glue.

It is a third object of the present invention to provide a fan motor in which a rotating shaft is assembled into a pair of ball bearings which rotatably support the rotating shaft, with no axial misalignment introduced. Other objects and advantages of the present invention will be apparent from the following description, the accompanying drawings and the appended claims.

DETAILED DESCRIPTION OF THE PREFERRED EMBODIMENTS

Referring now to the drawings, the present invention is discussed.

The first embodiment of the fan motor according to the present invention is described in detail referring to FIGS. 1 through 9.

Figure 1:
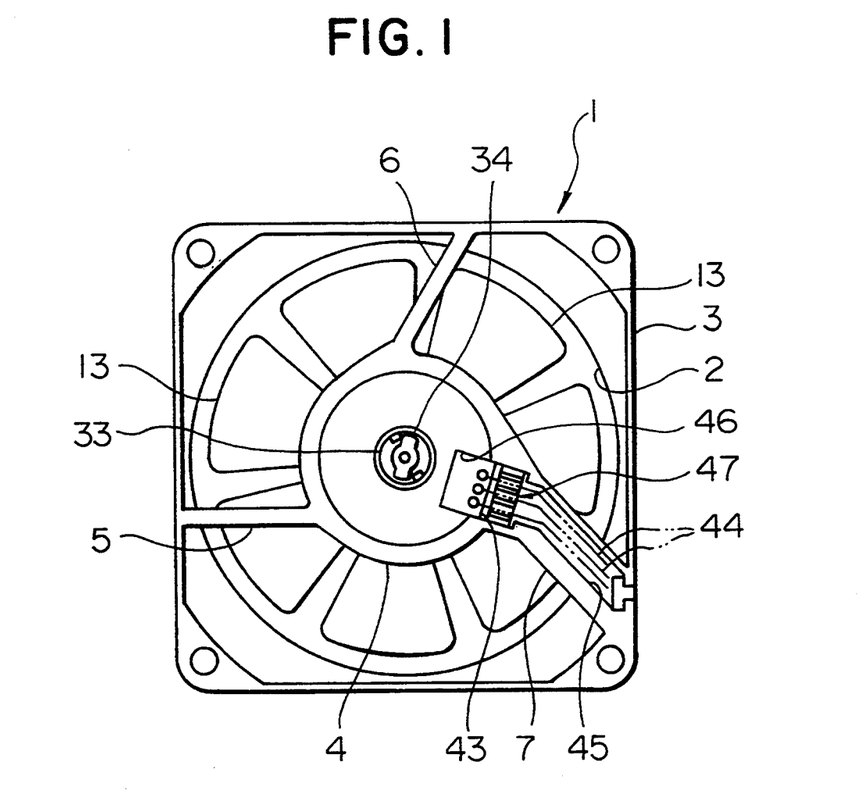
FIG. 1 is a bottom view showing generally a first embodiment of the fan motor according to the present invention.
Figure 2:
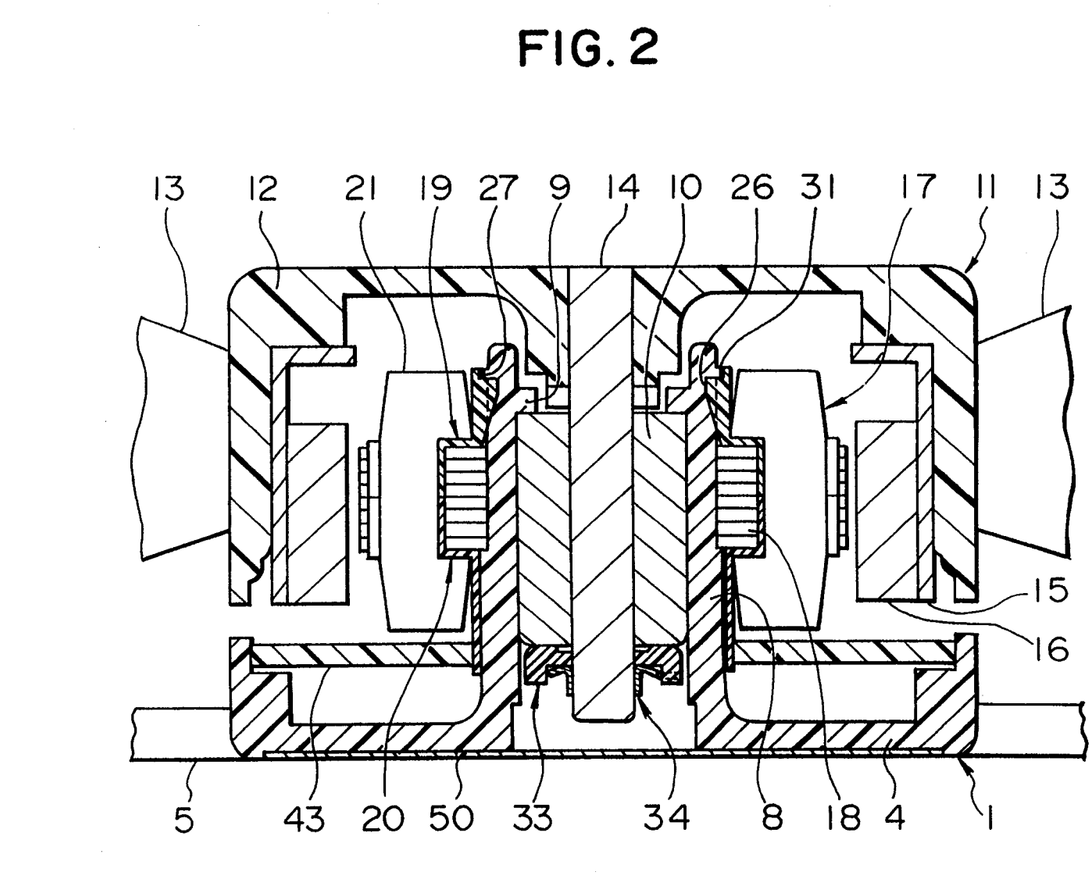
FIG. 2 is a general cross-sectional view of the fan motor of FIG. 1.

A synthetic resin housing 1 functioning as an outer covering for a fan motor comprises a main body 3 having a substantially square outer frame and a circular wind passage along its inner rim, a disk-like support 4, and three arms 5, 6, 7 connecting the main body 3 to the support 4. A cylindrical bearing race 8 is integrally formed with the support 4, and projected from the support 4 at the center. The bearing race 8 has, on its inner top portion, an inwardly projected portion 9. A cylindrical sleeve bearing 10 is inserted from below into the bearing race 8, but the inwardly projected portion 9 of the bearing race 8 restricts the passage of the bearing 10 on its way. The bearing 10 is made of an oil-impregnated, wear-resisting metal.

An impeller 11 comprises a pan-like rotor 12 and a plurality of blades 13 (seven blades in the embodiment) attached onto the outer circumferential surface of the rotor 12. The impeller 11 is integrally resin-molded. A metallic rotating shaft 14 is fixed to the center of the rotor 12 by means of press fitting or insert molding. A ring-shaped yoke 15 is securely attached to the inner circumferential surface of the rotor 12, and a ring-shaped magnet 16 is then attached to the inner surface of the yoke 15.

A stator 17 is mounted on the outer circumferential surface of the bearing race 8. The stator 17 comprises a stator core 18, top and bottom insulators 19, 20 for covering mainly the winding assembly of the core 18, and stator coils 21 wound around each tooth of the core 18.

Figure 5:
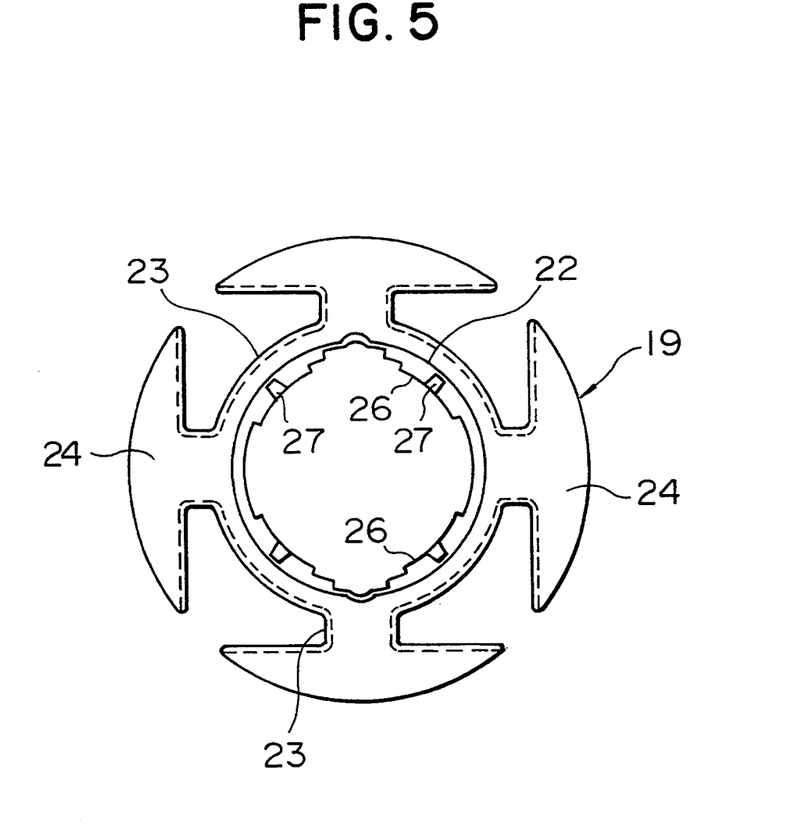
FIG. 5 is a plan view showing the top insulator of the fan motor of FIG. 2.
Figure 6:
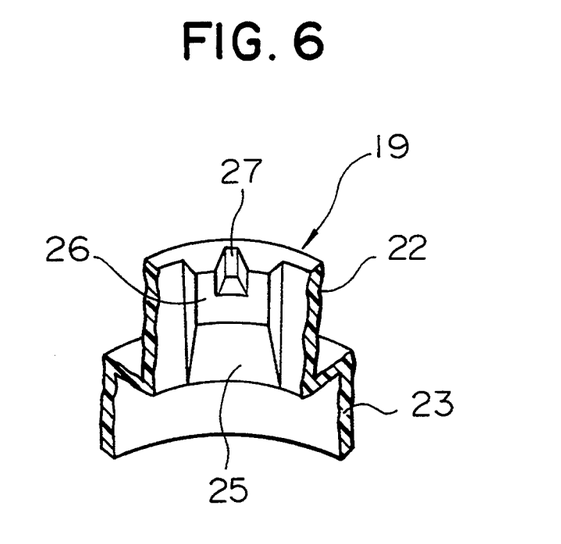
FIG. 6 is a perspective view showing the U-shaped groove of the insulator of the fan motor of FIG. 2.
Figure 8:
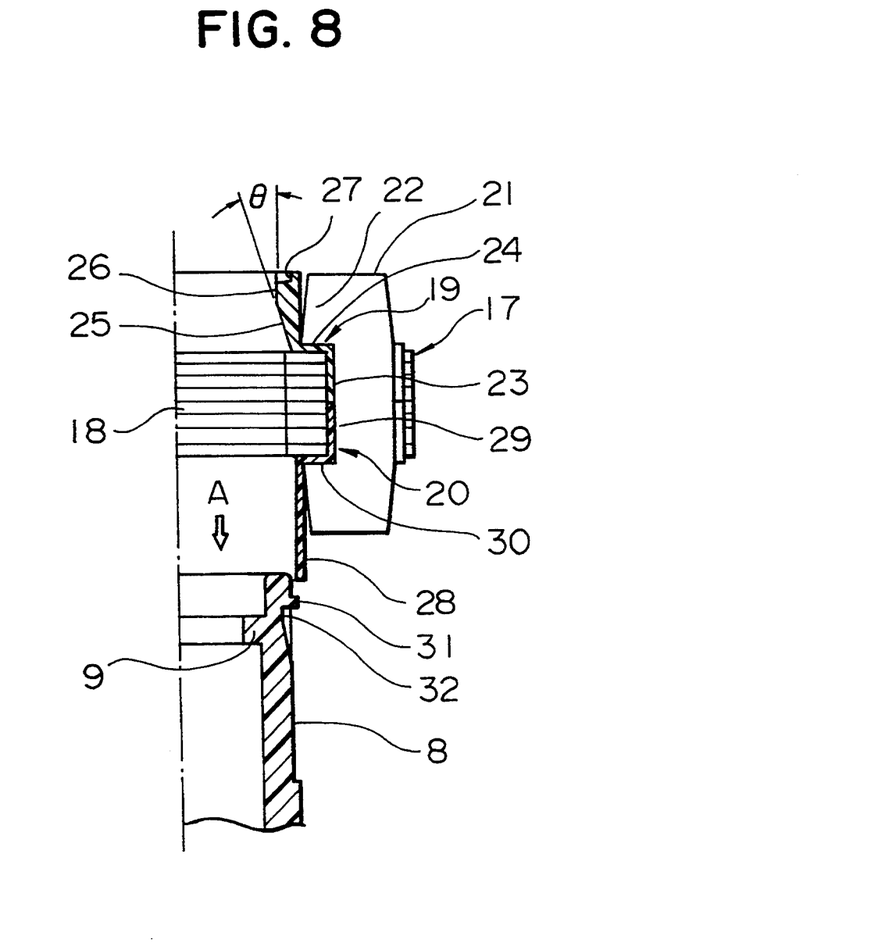
FIG. 8 is a cross-sectional view illustrating how the stator is assembled into the bearing race in the fan motor of FIG. 2.

FIGS. 5 and 6 show the top insulator 19. The insulator 19 is made of a cylinder portion 22 to be fitted around the bearing race 8, a wall portion 23 covering the circumferential surface of the stator core 18 except the circumferential surface of each tooth, and end plate portions 24 covering the top of each tooth. The top inner portion of the cylindrical portion 22 has a plurality (four in the embodiment) of inwardly projected portions 26 equally spaced around on the inner circumference, with each of the inwardly projected portions 26 having a bottom tapered face 25 upwardly inclined at a predetermined angle $\theta$. Each of the projections 26 has a U-shaped groove 27 at its top end. The width of each groove is wider as it extends radially inwardly. As shown in FIG. 8, the bottom insulator 20 is made of a cylindrical portion 28 fitted around the bearing race 8, a wall portion 29 covering the circumferential surface of the stator core 18 except the circumferential surface of each tooth, and end plate portions 30 covering the bottom of each tooth.

Figure 7:
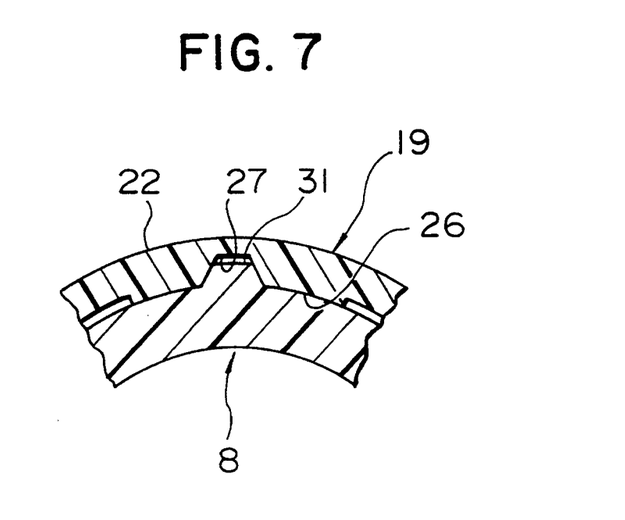
FIG. 7 is a cross-sectional view showing the engaged state of the U-shaped grooves of the insulator with the projections of the bearing race in the fan motor of FIG. 2.

The top end portion of the bearing race 8 has on its outer circumference a plurality of projections 31 (four in the embodiment) to be engaged with corresponding U-shaped grooves 27 of the insulator 19. The width of each projection is wider as it extends radially inwardly. Right below each projection 31, the top portion of the bearing race 8 is provided with a U-shaped groove 32 which is engaged with respective inwardly projected portion 26 of the insulator 19 with its elasticity.

The stator 17 is installed onto the bearing race 8 by pushing the insulators 19, 20 and the stator core 18 downward around the bearing race 8 from above in the direction of the arrow A in FIG. 8. In the course of this assembling, the cylinder portion 22 of the insulator 19 is elastically deformed radially outward, while the top portion of the bearing race 8 is elastically deformed radially inward. When each projection 26 is engaged with respective U-shaped groove 32, each projection 31 is engaged with respective U-shaped groove 27. In the engagement of the projections 31 with the U-shaped grooves 27, the tapered face of the cylinder portion 22 is interfaced with the inversely tapered face of the bearing race 8-with elasticity recovery action; thus, the stator 17 suffers no looseness in circular direction. The engagement of the projections 26 with the U-shaped grooves 32 firmly hold the stator 17 to the bearing race 8, restricting the stator 17 from passing through.

The shaft 14 of the impeller 11 is inserted into the sleeve bearing 10 from above. The stator 17 of the bearing race 8 is covered with the rotor 12 of the impeller 11, with each tooth of the stator 17 facing the inner surface of a rotor magnet 16 with a slight separation allowed between both.

Figure 3:
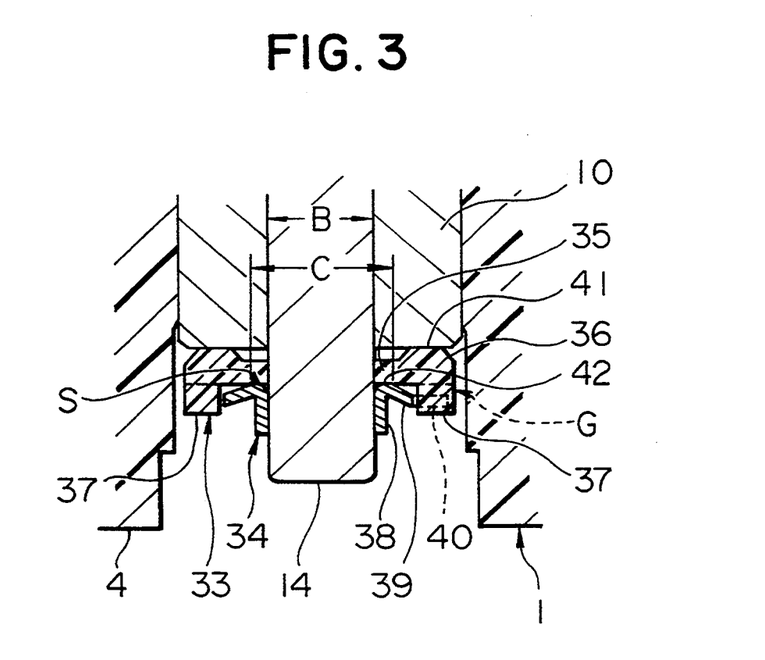
FIG. 3 is a cross-sectional view showing in detail a thrust plate and a stopper of FIG. 2.
Figure 4:
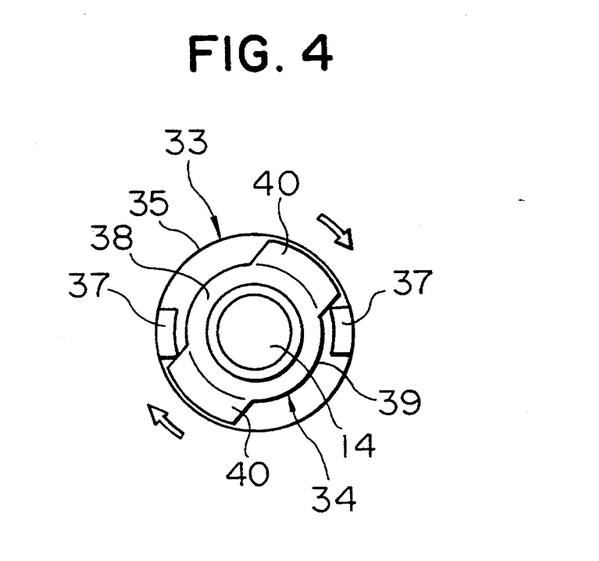
FIG. 4 is a bottom view of FIG. 3.

A thrust plate 33 is inserted around the bottom end portion of the shaft 14 projected from the sleeve bearing 10 bottom end, and then a stopper 34 is attached onto the end portion of the shaft against the thrust plate 33 by means of press fitting. As shown in FIGS. 3 and 4, the thrust plate 33 is formed of a disk portion 35 having a through hole at the center, a circular rim portion 36 projected upward from the disk portion 35, and a pair of projections 37, 37 on the bottom side of the disk portion 35. The shaft 14 inserted through the thrust plate 33 is rotatably supported by the thrust plate 33. The stopper 34 holds the thrust plate 33, preventing it from coming off the shaft 14. The stopper 34 is formed of a short cylinder portion 38, an umbrella-shaped disk portion 39 inclined at a predetermined angle, and a pair of engagement lips 40, 40 which extend radially outward from the disk portion 39. The stopper 34 is a unitary structure into which sheet metal is pressed.

In the assembly shown in FIG. 2, the magnetic center of the stator 17 is slightly misaligned with the magnetic center of the rotor magnet 16, and thus the impeller 11 is slightly raised. This causes the flat sliding face 41 of the rim portion 36 to be pressed against the bottom end face of the sleeve bearing 10. The circular projected portion 42 of the stopper 38 is also pressed against the underside of the disk portion 35 of the thrust plate 33. The above arrangement results in an circular contact area S between the stopper 34 and the thrust plate 33 near their inner circumferences, while allowing a non-contacting small gap G near their outer circumferences. Since the lips 40, 40 of the stopper 34 are put into engagement with the projections 37, 37 of the thrust plate 37, 37, the stopper 34 and the thrust plate 33 are integrally rotatable in a predetermined direction.

The non-contacting small gap G is typically 0.15 mm, and is gradually narrowed as it runs radially inwardly toward inner circumferences of the thrust plate 33 and the stopper 34. The diameter C of the circular contact area S is typically set to $C = B + 1$ to 2 (mm), where B is the diameter of the shaft 14.

Such an arrangement of the stopper 34 and the thrust plate 33 allows-the stopper 34 to securely contact with the thrust plate 33 on the circular contact area S, even if the stopper 34 is press fitted to the shaft 14 with a slight inclination introduced with respect to the thrust plate 33. As a result, a uniform contact is achieved between the thrust plate 33 and the sleeve bearing 10 while the thrust plate 33 is sliding on the bottom end face of the sleeve bearing 10.

The stator coils 21 of the stator 17 are connected, via unshown terminals, to a printed circuit board 43 which is installed on the support 4 with the board 43 in parallel with the top surface of the support 4. The arm 7 of the three arms 5, 6, and 7 of the housing 3 is wider across it than the remaining two. Disposed on the underside of the arm 7 is a guide channel 45 for routing leads 44 for wiring. An opening 46 which communicates with the guide channel 45 is provided on the junction where the arm 7 joins the support 4. The ends of the leads 44 are soldered to the printed circuit board 43 at the opening 46.

Figure 9:
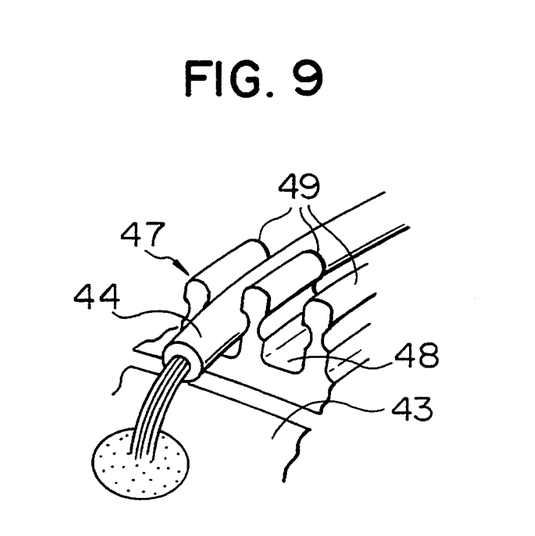
FIG. 9 is a perspective view showing leads and their clamp member of FIG. 1.

A synthetic resin clamp member 47 is attached on the opening 48 near the arm 7. As shown in FIG. 9, the cleat clamp 47 is formed of a base portion 48 and a plurality of grip projections 49 juxtaposed. The end portion of each lead 44 is pushed into between the neighboring grip projections 49, and the conductors of the leads 44 are then properly located to respective soldering positions of the printed circuit board 43. This arrangement facilitates soldering operation, even allowing the soldering operation to be automated.

A sheet 50 made of paper or polyester is stuck onto the bottom side of the support 4, and thus covers the bottom opening of the bearing race 8 as well as the opening 46 for wiring.

In the fan motor arranged as above, the stopper 34 which is attached to the shaft 14 against the thrust plate 33 is an umbrella-shaped structure with a predetermined inclination; thus, the stopper 34 keeps secure contact with the thrust plate 33 on the circular contact area S, even if the stopper 34 is press fitted to the shaft 14 with a slight tilt introduced with respect to the thrust plate 33, and a uniform contact is achieved between the thrust plate 33 and the sleeve bearing 10 while the thrust plate 33 is sliding on the bottom end face of the sleeve bearing 10. This prevents a localized wear on the thrust plate 33 in the course of the rotation of the shaft 14, providing a prolonged life expectancy of the thrust plate 33 and avoiding the mechanical noise due to rubbing.

When the stator 17 is fitted around the bearing race 8 each projection 26 formed on the insulator 19 provided on the top of the stator 17 is engaged with respective U-shaped groove 32 and each projection 31 of the bearing race B is engaged with respective U-shaped groove 27 of the insulator 19. This prevents the stator 17 both from passing through the bearing race 8 and from rotatably sliding around the bearing race 8. In the engagement of the projections 31 with the U-shaped grooves 27, the tapered face of the cylinder portion 22 is interfaced with the inversely tapered face of the bearing race 8, and thus no circular gap is allowed between each U-shaped groove 27 and respective projection B1. This effectively avoid any looseness in a circular direction.

Figure 10:
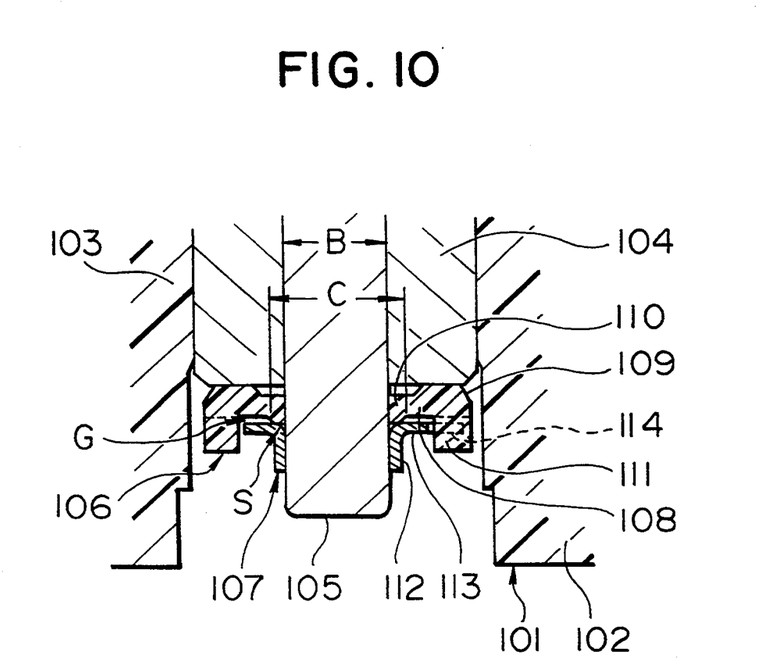
FIG. 10 is a cross-sectional view showing in detail a thrust plate and a stopper of a second embodiment of the fan motor according to the present invention.

Referring now to FIG. 10, the second embodiment of the fan motor according to the present invention is discussed.

In the fan motor shown in FIG. 10, a synthetic resin housing 101 integrally has at the center the disk-like support 102 from which a cylindrical bearing race 103 is projected. A cylindrical sleeve bearing 104 is inserted into the bearing race 103 from below. The sleeve bearing 104 is made of an oil-impregnated, wear-resisting metal.

The shaft 105 of an impeller is inserted into the sleeve bearing 104. A thrust plate 106 is fitted to the bottom end portion of the shaft 104 projected out of the bottom end of the sleeve bearing 104, and further a stopper 107 is pressed fitted to the shaft 104 from below.

The thrust plate 106 is formed of a disk portion 108 having a through hole at the center, a circular rim portion 109 projected upward from the disk portion 108, a circular projection 110 formed around the through hole on the underside of the disk portion 108, and a pair of projections 111, 111 formed near the outer circumference of the disk portion 108 on its underside. The stopper 107 is formed of a short cylinder portion 112, a flange portion 113 projecting outward from the top end of the short cylinder portion 112 at right angles, and a pair of lips 114 extending radially outward from the flange portion. The stopper 107 is of a unitary structure into which sheet metal is pressed.

The stopper 107 is attached against the thrust plate 106 to the end portion of the shaft 105, thereby holding the thrust plate 106 in place. The flange portion 113 of the stopper 107 is put into uniform contact with the circular projection 110 of the thrust plate 106, resulting in a circular contact area S of a diameter C between the stopper 107 and the thrust plate 106 near their inner circumferences. Along with this, a non-contacting small gap G near their outer circumferences is formed.

In the fan motor arranged above, even if the stopper 107 is press fitted to the shaft 105 with a slight inclination introduced with respect to the thrust plate 106, the stopper 107 is kept in secure contact with the thrust plate 106 on the circular contact area S. As a result, a uniform contact is achieved between the thrust plate 106 and the sleeve bearing 104. This prevents a localized wear on the thrust plate 106 in the course of the rotation of the shaft 105, thereby avoiding the mechanical rubbing noise.

Referring to FIGS. 11 through 16, the third embodiment of the fan motor according to the present invention is discussed.

Figure 11:
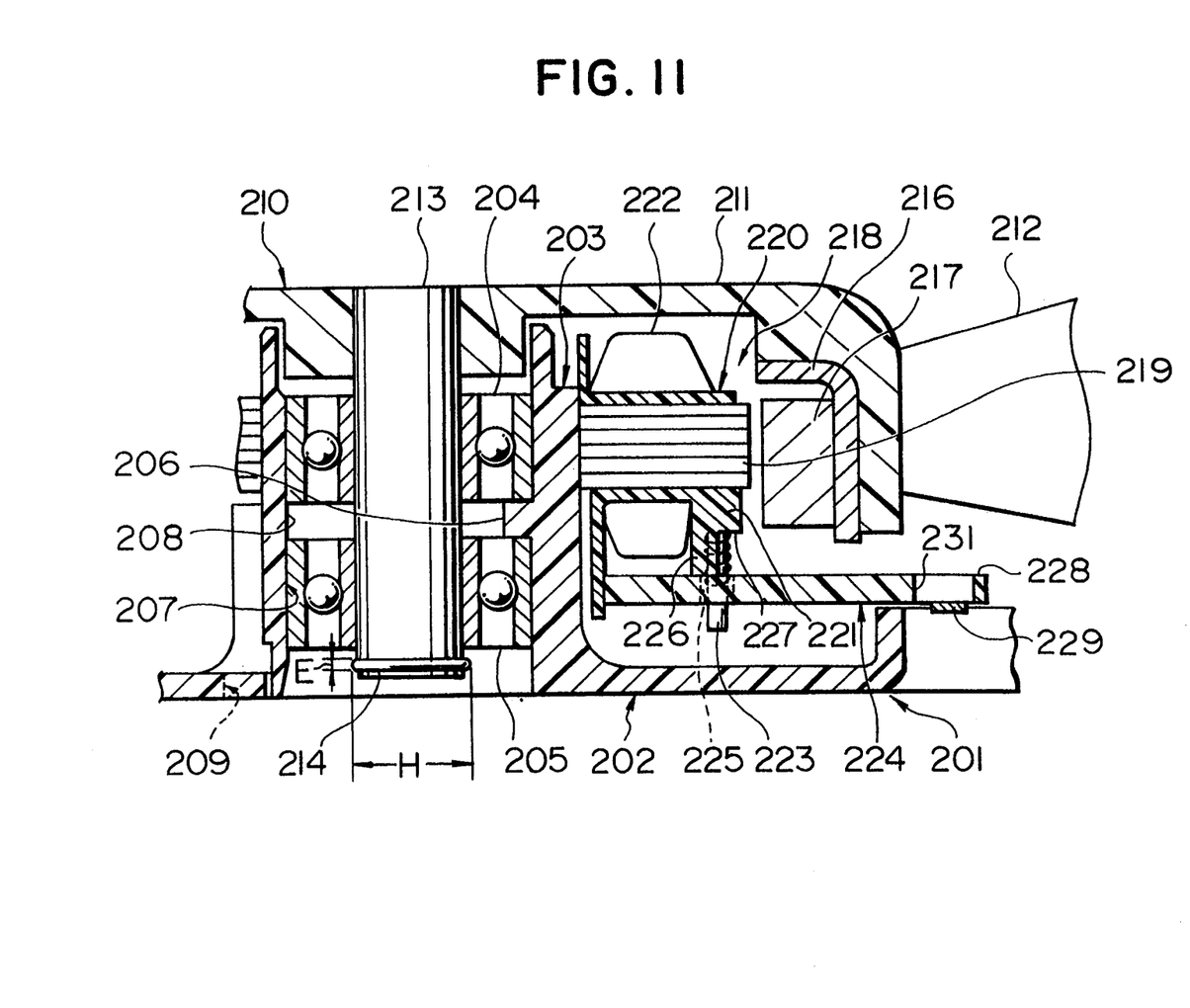
FIG. 11 is a cross-sectional view showing a third embodiment of the fan motor according to the present invention.

A synthetic resin housing 201 functioning as an outer covering of the fan motor is integrally formed of a pan-like support 202 at the center and a cylindrical bearing race 203 projected from the center of the support 202.

Figure 12:
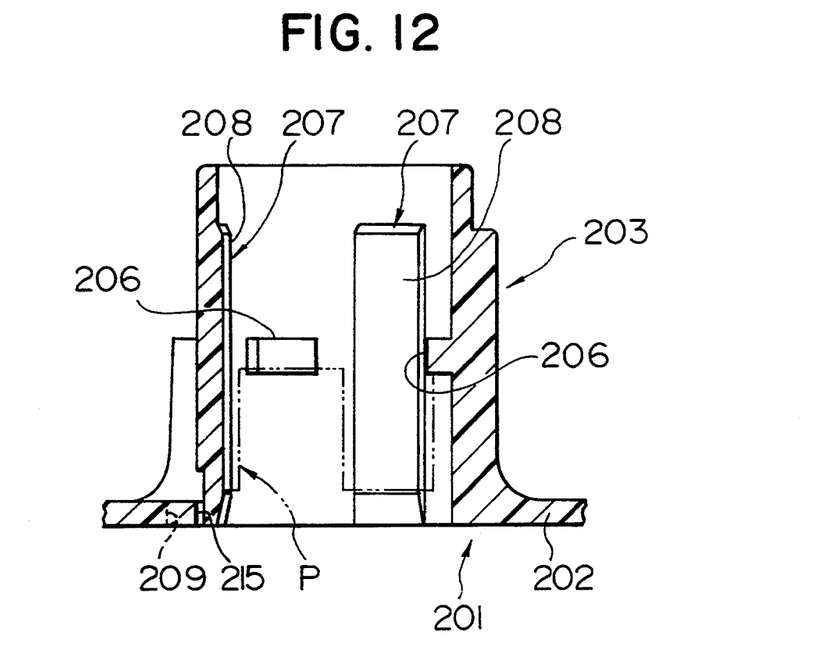
FIG. 12 is a cross-sectional view showing the bearing race of the fan motor of FIG. 11.
Figure 13:
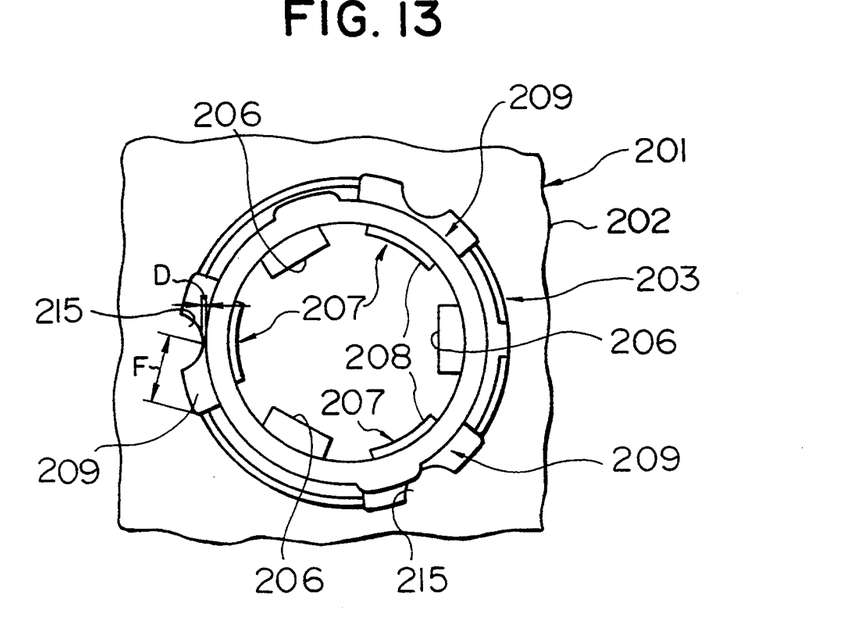
FIG. 13 is a plan view showing the bearing race of FIG. 12.

As shown in FIGS. 12 and 13, the bearing race 203 is provided with a plurality of projections 206 (three projections in this embodiment) equally apart around on the inner circumference of the bearing race 203 about at its middle position along the length of the bearing race in order to axially locate a pair of ball bearings 204, 205. The bearing race 203 is provided further with a plurality of low-profile projections 207 (three low-profile projections in this embodiment), each formed between the neighboring projections 206 around on the inner circumference of the bearing race 203, wherein each of the projections 207 extends substantially longer in the axial direction of the bearing race 203. A pair of ball bearings 204, 205 are commonly supported by the inner walls 208 of the three low-profile projections 207.

The two-dot chain line in FIG. 12 represents the parting line P of the molds for the housing 201, namely, the parting face between a pair of molds. The parting line P runs vertically down along one side of the low-profile 207, horizontally across near the bottom end of the low-profile projection 207, vertically up along the other side of the low-profile projection 207, and then reaches the projection 206. The parting line P is of a comb-like shape if viewed from side. This means that only a single mold serves to form the inner wall faces 208 of the low-profile projections 207. Even if an axial misalignment takes place between a pair of molds, such a misalignment will not transferred to the resulting configuration of each low-profile projection 207.

A relief window 209 is opened through the outer circumference of the bearing race 203 correspondingly to each of the low-profile projections 207 inside. The thickness of the bearing race 203 is partially reduced by the relief windows 209 so that the bearing race 203 may be elastically deformed in the area affected by the relief windows 20. The insertion of the ball bearing 205 meets a difficulty if any radially inward fins takes place along the parting line across near the bottom of the low-profile projection in the course of molding. The relief windows 209 allow the bearing race 203 to elastically deform radially outward toward the relief windows 209, and facilitates the insertion of the ball bearing 205.

The impeller 210 rotatably supported by the housing 201 comprises a pan-like rotor 211 and blades 212. The shaft 213 rigidly attached to the rotor 211 at the center is inserted through a pair of bearings 204, 205. A locking wire ring 214 for restricting axial passage is attached to the end portion of the shaft 213 which is inserted through both bearings 204, 205. The wire ring 214 may be manually installed with the housing 201 held upside down. In this operation, the wire ring 214 may be easily slipped off hands. The wire ring 214 is very small; its diameter is about 3 mm. If the relief window 209 is shaped so that it passes the wire ring 214 through, there is a good chance that the wire ring 214 falls into the interior of the fan motor through the relief window 209. If it happens, disassembling of the fan motor is required to take the wire ring 214 out.

In this embodiment, however, the relief windows 209 of the housing 201 have a shape that allows no passage of the wire ring 214 therethrough. Specifically, a semi-circular projection 215 extends radially inward to the center of each release window 209. The gap D between the inner end of the projection 215 and the inner circumference of the relief window is set smaller than the width E of the wire ring 214, and the maximum diagonal length F measured from the position of the minimum gap of the relief window 209 is set to smaller than the outer diameter H of the wire ring 214. If a wire ring 214 happens to fall on a relief window 209 in the installation of the wire ring 214 onto the end portion of the shaft 213, the wire ring 214 is prevented from falling within the fan motor.

A ring-shaped yoke 216 is attached to the inner circumferential surface of the support 211 of the impeller 210, and a ring-shaped rotor magnet 217 is then attached to the inner surface of the yoke 216.

Figure 14:
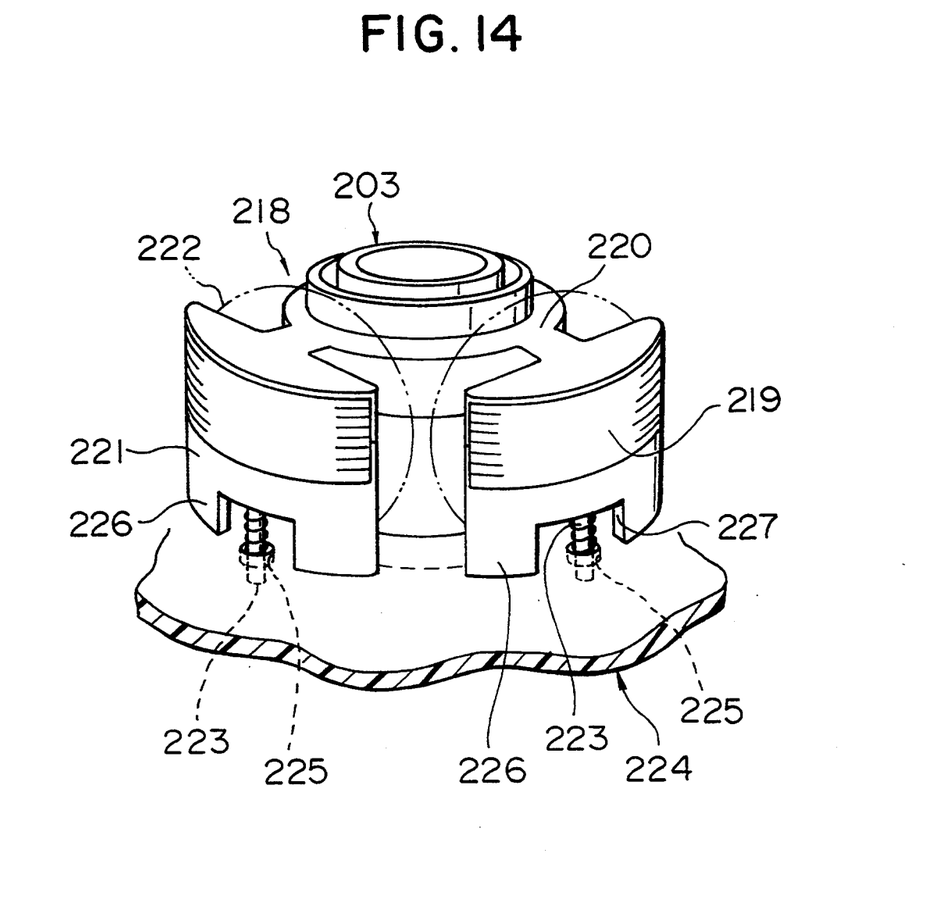
FIG. 14 is a perspective view showing the stator of the fan motor of FIG. 11.

A stator 218 is attached onto the outer circumference of the bearing race 203, and the stator 218 is covered with the support 211. As shown in FIGS. 11 and 14, the stator 218 comprises a stator core 219, top and bottom insulators 220, 221 covering the circumferential surface of the stator core 219 except the circumferential surface of each tooth of the stator core 219 and stator coils 222 wound around each tooth of the stator core 219 along with the top and bottom insulators 220, 221.

A plurality of terminal conductor pins 223 (three pins in this embodiment) are projected downward from the insulator 220. The end of each stator coils 222 is connected to respective terminal pin 223. Corresponding to each terminal pin 223, a through hole 225 is opened through a disk-like printed circuit board 224 mounted over the support 202, and each terminal pin 223 is then soldered to respective conductor trace on the back side of the printed circuit board 224 to complete the wiring of the stator coils 222.

The bottom insulator 221 is provided, under each tooth of the stator core, with a semi-circular support end 226 which is pressed against the printed circuit board 224 at right angles. Each semi-circular support end 226 has at the bottom center a cutaway portion 227 for heat dissipation considerations. When the stator 218 is fitted around the bearing race 203, the terminal pins 223 on the insulator 221 are inserted respective through holes 225 of the printed circuit board 224. If the stator 218 in its installed state remains inclined with respect to the printed circuit board 224, a lead of the stator coil reaching respective terminal pin 223 may rub against the edge of a through hole 225, and consequently the coil connection thus may be disconnected. Since the bottom insulator 221 has support ends 226 which are pressed against the printed circuit board 224 with the stator 218 fitted around the bearing race 203, each terminal pin 223 is kept at right angles to the printed circuit board 224. This arrangement prevents the stator coils 222 from rubbing against the edge of an through hole 225, and an open connection is thus avoided.

Figure 15:
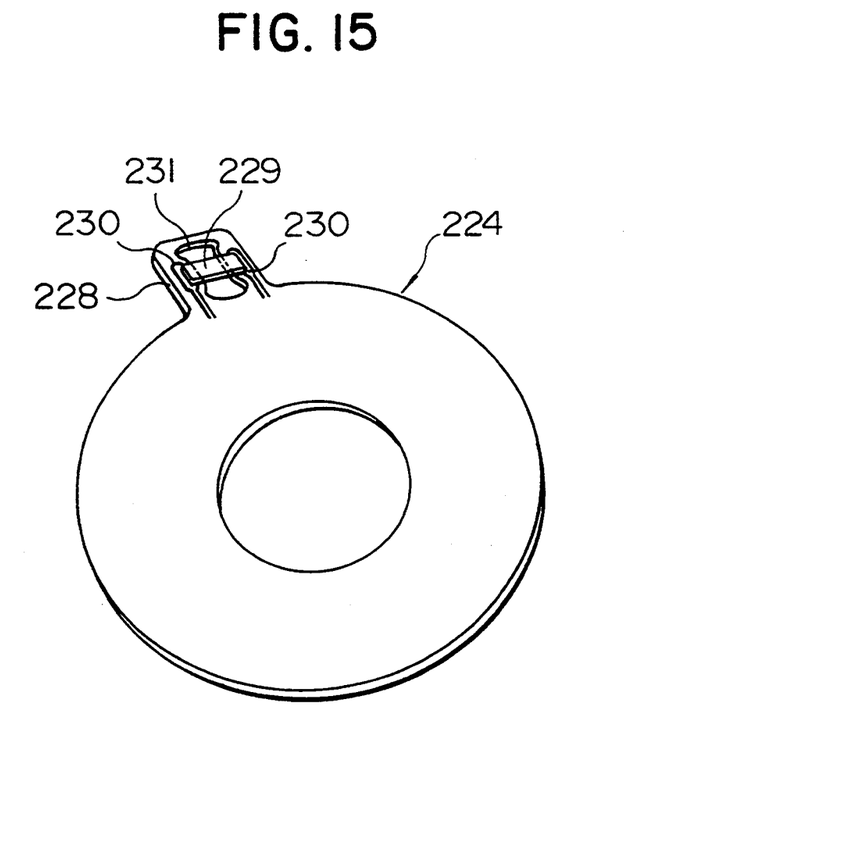
FIG. 15 is a perspective view showing the printed circuit board of the fan motor of FIG. 11.

Mounted on the printed circuit board 224 are a Hail effect device, a controller IC for controlling driving timing of the stator coils 222, a temperature sensor, and other chip components. The temperature sensor detects the temperature of air current delivered by the blades 212. The controller IC controls the rotational speed of the impeller in response to the detected temperature. Specifically, this embodiment of the fan motor has two rotational speeds selectively available: low speed and high speed. When the temperature of the delivered air rises, the fan motor is switched to the high rotational speed operation to accelerate the circulation of cooling air. When the temperature falls, the fan motor is switched back to the low speed to reduce the power consumption.

For the purpose of temperature detection, the printed circuit board 224 has, as its integral part, a mounting portion 228 which extends radially outward as shown in FIG. 15, and a chip thermistor 229 is directly connected to trace lands 230, 230 on the mounting portion 228. The mounting portion 228 is provided with a hole 231 to assure that the thermistor 229 is directly exposed to circulating air. This allows the thermistor 229 to accurately detect the temperature of the delivered air. Since the mounting portion 228 extends radially outward, the thermistor 229 on it is little affected by heat generated by circuit components such as ICs and resistors on the printed circuit board 224. Thus, temperature detection error introduced by disturbing heat is minimal, and thus the thermistor 229 detects the temperature of the atmosphere as desired with sufficient accuracy. Furthermore, compared to a thermistor with leads which may need manual soldering to a printed circuit board, the chip thermistor 229 may be easily subjected to automated mounting along with other chip components on the printed circuit board 224.

Figure 16:
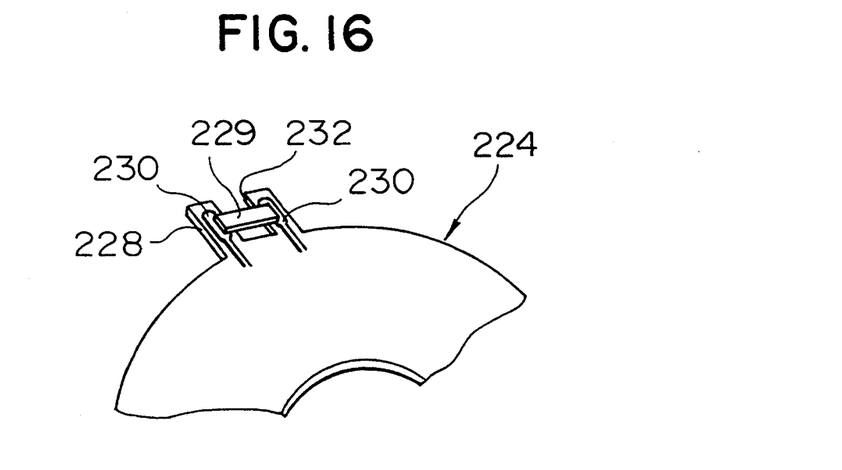
FIG. 16 is a partially cutaway perspective view showing a variation of the printed circuit board.

FIG. 16 shows a variation of the printed circuit board 224. The mounting portion 228 of the printed circuit board 224 is provided with a U-shaped cutaway 232. The thermistor 229 is installed over the cutaway 232.

In the fan motor arranged above, a single mold is used to form the low-profile projections 207 on the inner circumferential surface of the bearing race 203 which is projected from the housing 201, and a pair of ball bearings 204, 205 are press fitted into along the inner wall surfaces of the low-profile projections 207. This eliminates the possibility of any axial misalignment of the low-profile projections 207 between their top portion and bottom portion. A pair of ball bearings 204, 205 are thus correctly axially aligned even if the separation between both ball bearings 204, 205 is small. Therefore, no axial misalignment takes place of the shaft 213 which is inserted through both ball bearings 204, 205.

While specific embodiments of the fan motor according to the present invention have been described in detail, it is to be understood that the present invention is not limited to these embodiments, and that various modifications and variations may be made without departing from the scope of the present invention.

What is claimed is:

1. A fan motor including a housing, a cylindrical bearing race projected from the center portion of the housing, an impeller having a plurality of blades on its outer circumference, a shaft attached to the axial center of the impeller and inserted through a bearing into the bearing race, a stator fitted around the outer circumferential surface of the bearing race and facing the rotor magnet attached to the impeller, said fan motor comprising said stator which comprises a stator core, an insulator covering the outer circumferential surface of the stator core except the outer circumferential surfaces of a plurality of teeth of the stator core, a stator coil wound around each tooth of the stator core along with the insulator such that axial passage restricting means and rotation restricting means are formed between a cylindrical portion of the insulator which is fitted around a bearing race and the outer circumferential portion of the bearing race, said axial passage restricting means comprising a plurality of projections equally spaced around on the inner circumferential surface of the cylindrical portion of the insulator and comprising a plurality of U-shaped grooves equally spaced around on the outer circumferential surface of the bearing race such that the projections are engaged with respective U-shaped grooves when the stator is fitted around with the bearing race, and a tapered face formed under each projection of the cylindrical portion in order to guide the cylindrical portion when the stator is fitted around with the bearing race.

2. The fan motor according to claim 1, the insulator is made of split top and bottom portions, and the top insulator portion is provided with the axial passage restricting means and part of the rotation restricting means.

3. A fan motor including a housing, a cylindrical bearing race projected from the center portion of the housing, an impeller having a plurality of blades on its outer circumference, a shaft attached to the axial center of the impeller and inserted through a bearing into the bearing race, a stator fitted around the outer circumferential surface of the bearing race and facing the rotor magnet attached to the impeller, said fan motor comprising said stator which comprises a stator core, an insulator covering the outer circumferential surface of the stator core except the outer circumferential surfaces of a plurality of teeth of the stator core, and a stator coil wound around each tooth of the stator core along with the insulator such that axial passage restricting means and rotation restricting means are formed between a cylindrical portion of the insulator which is fitted around the bearing race and the outer circumferential portion of the bearing race, the rotation restricting means comprising a plurality of U-shaped grooves formed on a top inner circular portion of the cylindrical portion and by a plurality of projections extending radially outward from a top end of the bearing race such that the projections are engaged with respective U-shaped grooves when the stator is fitted around with the bearing race, each of the U-shaped grooves tapering in width as the grooves extend radially outward and each of the projections tapering in width as the projections extend radially outward.

4. The fan motor according to claim 3, further including a plurality of projections formed on the cylindrical portion, each of the U-shaped grooves being formed on each of the projections formed on the cylindrical portion, the projections constituting part of said axial passage restricting means.

5. A fan motor according to claim 3, wherein the insulator is made of split top and bottom portions, and the top insulator portion is provided with the axial passage restricting means and part of the rotation restricting means.

6. A fan motor including a housing, a cylindrical bearing race projected from the center portion of the housing and provided with openings at both ends, an impeller having a plurality of blades on its outer circumference, a shaft attached to the axial center portion of the impeller, and a stator fitted around the outer circumferential surface of said bearing race, said shaft being inserted through a bearing into said bearing race so that said stator could face to the rotor magnet attached to said impeller, said bearings including a pair of ball bearings, said bearings respectively being placed at each end of the inner side of said bearing race, or in the vicinity thereof, a plurality of projections being placed circumferentially around a center portion of said bearing race in a certain spacing so as to locate axially both said ball bearings on the inner side surface of said bearing race, a plurality of low-profile projections being formed on the inner side surface of said bearing race as axially elongated from one installing position of one of said ball bearings to that of another installing position of the other ball bearing in a sequence between two neighboring projections, and said ball bearings supported by the inner side of each low-profile projection respectively at one end portion and the other end portion of each low-profile projection.

7. The fan motor according to claim 6, wherein the bearing race is resin molded, a parting line which represents the parting face between a pair of molds is a comb-like shape, running along near both sides and ends of each low-profile projection and reaching the projection, and the low-profile projections are molded based on a single mold only.

8. The fan motor according to claim 6, wherein a tapered face is formed on both ends of each low-profile projection in order to guide both ball bearings.

9. The fan motor according to claim 6, wherein a window is opened through on the outer circumferential surface of the bearing race, corresponding to each low-profile projection inside.

10. The fan motor according to claim 9, wherein width and length of the window are set smaller than the width and length of components to be used.

* * * * *